United States Patent [19]

Kim

[11] Patent Number: 6,055,337
[45] Date of Patent: Apr. 25, 2000

[54] METHOD AND APPARATUS FOR ENCODING A CONTOUR OF AN OBJECT EXPRESSED IN A VIDEO SIGNAL

[75] Inventor: Jin-Hun Kim, Seoul, Rep. of Korea

[73] Assignee: Daewoo Electronics Co. Ltd., Rep. of Korea

[21] Appl. No.: 08/687,278

[22] Filed: Jul. 25, 1996

[30] Foreign Application Priority Data

Jul. 9, 1996 [KR] Rep. of Korea ................. 96-27574

[51] Int. Cl.$^7$ ................................................. G06K 9/48
[52] U.S. Cl. .................. 382/242; 382/232; 382/266
[58] Field of Search ....................... 382/242, 197, 382/203, 199, 232, 236, 237, 152, 256, 266, 131, 132, 180; 445/30; 395/133, 120

[56] References Cited

U.S. PATENT DOCUMENTS

| | | | |
|---|---|---|---|
| 4,817,173 | 3/1989 | Furukoori | 382/197 |
| 4,834,686 | 5/1989 | Kautz | 445/30 |
| 4,884,224 | 11/1989 | Hirosawa | 382/242 |
| 5,072,384 | 12/1991 | Doi et al. | 382/132 |
| 5,091,976 | 2/1992 | Murayama | 382/197 |
| 5,506,947 | 4/1996 | Taubin | 395/133 |
| 5,559,901 | 9/1996 | Lobregt | 382/197 |
| 5,604,822 | 2/1997 | Pearson et al. | 382/199 |
| 5,635,986 | 6/1997 | Kim | 382/242 |
| 5,737,449 | 4/1998 | Lee | 382/242 |

FOREIGN PATENT DOCUMENTS 2296839  7/1996  United Kingdom ............. H04N 5/14

OTHER PUBLICATIONS

Hötter, "Object–Oriented Analysis–Synthesis Coding Based on Moving Two–Dimensional Objects"–Signal Processing Image Communication–pp. 409–428, Dec. 1990.

Chuang–Gu et al. "Contour Simplification and Motion Compensated Coding"–Signal Processing Image Communication–pp. 279–296, Dec. 1995.

Primary Examiner—Jose L. Couso
Assistant Examiner—Anh Hong Do
Attorney, Agent, or Firm—Anderson Kill & Olick

[57] ABSTRACT

A method encodes a contour image of an object expressed in a video signal. First, a centroid for the contour of the object is detected by averaging pixel positions on the contour. A set of primary vertices on the contour are determined based on the centroid. Subsequently, a set of secondary vertices on the contour are determined based on the set of primary vertices. The set of primary vertices, the set of secondary vertices and the centroid are encoded to provide a digitally coded contour signal.

30 Claims, 4 Drawing Sheets

METHOD AND APPARATUS FOR ENCODING A CONTOUR OF AN OBJECT EXPRESSED IN A VIDEO SIGNAL

FIELD OF THE INVENTION

The present invention relates to a method and apparatus for encoding a contour of an object expressed in a video signal; and, more particularly, to a method and apparatus capable of effectively encoding a contour of an object contained in a video signal.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of the data through the use of various data compression techniques, especially, in the case of such low bit-rate video signal encoder as video-telephone and teleconference system.

One of such techniques for encoding video signals for a low bit-rate encoding system is an object-oriented analysis-synthesis coding technique, wherein an input video image is divided into objects and three sets of parameters for defining the motion, the contour and pixel data of each object are processed through different encoding channels.

One example of such object-oriented coding scheme is the so-called MPEG(Moving Picture Experts Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV, etc.) and surveillance(see, for instance, MPEG-4 Video Verification Model Version 2.0, International Organisation for Standardisation, ISO/IEC JTC1/SC29/WG11 N1260, March 1996).

According to MPEG-4, an input video image is divided into a plurality of video object planes(VOP's), which correspond to entities in a bitstream that a user can access and manipulate(cut, paste, etc.), and which can be referred to as an object. The width and height of each VOP may be smallest multiples of 16 pixels(a macroblock size) surrounding each object so that the encoder processes the input video image on a VOP-by-VOP basis, i.e., an object-by-object basis. The VOP includes color information consisting of Y, U, V components and shape information represented by, e.g., a binary mask.

In processing a contour image of an object, contour information is important for the analysis and synthesis of an object shape. The classical coding technique representing the contour information is a chain coding technique. Although the contour information may be faithfully coded without any loss thereof by employing the chain coding technique, it requires a substantial amount of data for the representation thereof.

One of the techniques introduced to reduce the amount of data representing the contour of an object is a polygonal approximation technique, wherein two starting vertex points are first selected. If the contour is of an open loop, two end points are selected as the starting vertex points. On the other hand, if the contour is in the form of a closed loop, two farthest points on the contour are selected as the starting vertex points. And then, the farthest point on the contour from a straight line segment joining the starting vertex points is determined. If the distance between the farthest point and the straight line segment is greater than a predetermined threshold value, a farthest point becomes a vertex point. This procedure is repeated, for each straight line segment, until the distance between the farthest point and said each straight line segment becomes smaller than or equal to the predetermined threshold value, wherein each straight line segment connects two adjacent vertices. As a result of the above process, a number of vertices are determined and the contour of an object is approximated by fitting the contour with a plurality of straight line segments. Vertex information representing the positions of the vertices on the contour is then encoded for the transmission thereof.

Even though it is possible to greatly reduce the volume of data to be transmitted by representing the contour with the connected straight line segments, it may still result in an increased computational complexity for the approximation of the contour and, therefore, remain to be desirable for further reduction of the data volume in order to successfully implement the technique in a low-bit rate codec system.

SUMMARY OF THE INVENTION

It is, therefore, a primary object of the invention to provide a contour encoding method and apparatus which is capable of representing a contour image with a reduced computational complexity and achieving a substantial reduction in the volume of transmission data.

In accordance with the invention, there is provided a method for encoding a contour of an object expressed in a video signal, comprising the steps of: (a) detecting a centroid for the contour of the object by averaging pixel positions on the contour; (b) determining a set of primary vertices on the contour based on the centroid, the contour being approximated by connecting each pair of adjacent primary vertices with a straight line; (c) obtaining a set of secondary vertices on the contour based on the set of primary vertices; and (d) encoding the set of primary vertices, the set of secondary vertices and the centroid to thereby provide a digitally coded contour signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
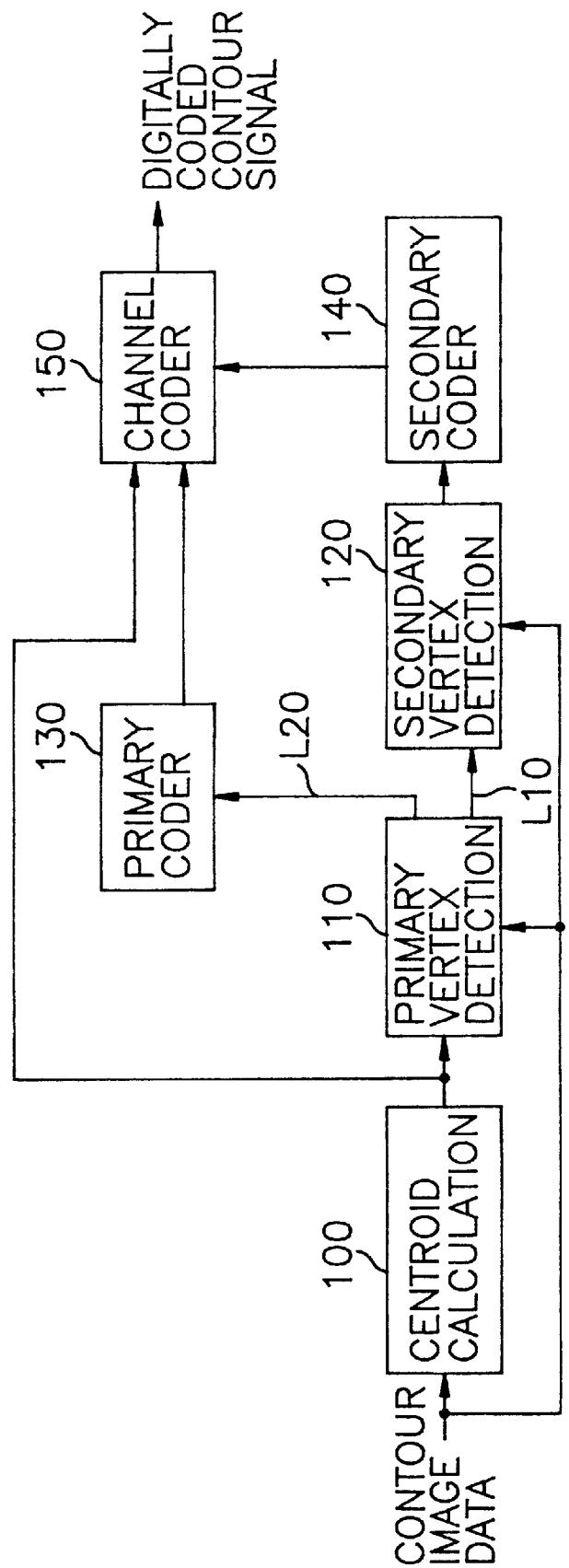
FIG. 1 depicts a block diagram of the inventive apparatus for encoding a contour image.

Referring to FIG. 1, there is shown a block diagram of the inventive apparatus for encoding a contour image of an object expressed in a video signal.

The contour image data representing the contour of an object is fed to a centroid calculation block 100, a primary and a secondary vertex detection blocks 110 and 120 in parallel.

The centroid calculation block 100 finds a centroid for the contour of the object by averaging coordinates of all the pixel positions on the contour and provides centroid position data to the primary vertex detection block 110 and a channel coder 150.

The primary vertex detection block 110 determines primary vertices of the contour based on the contour image data and the centroid position data in accordance with the present invention.

Figure 2:
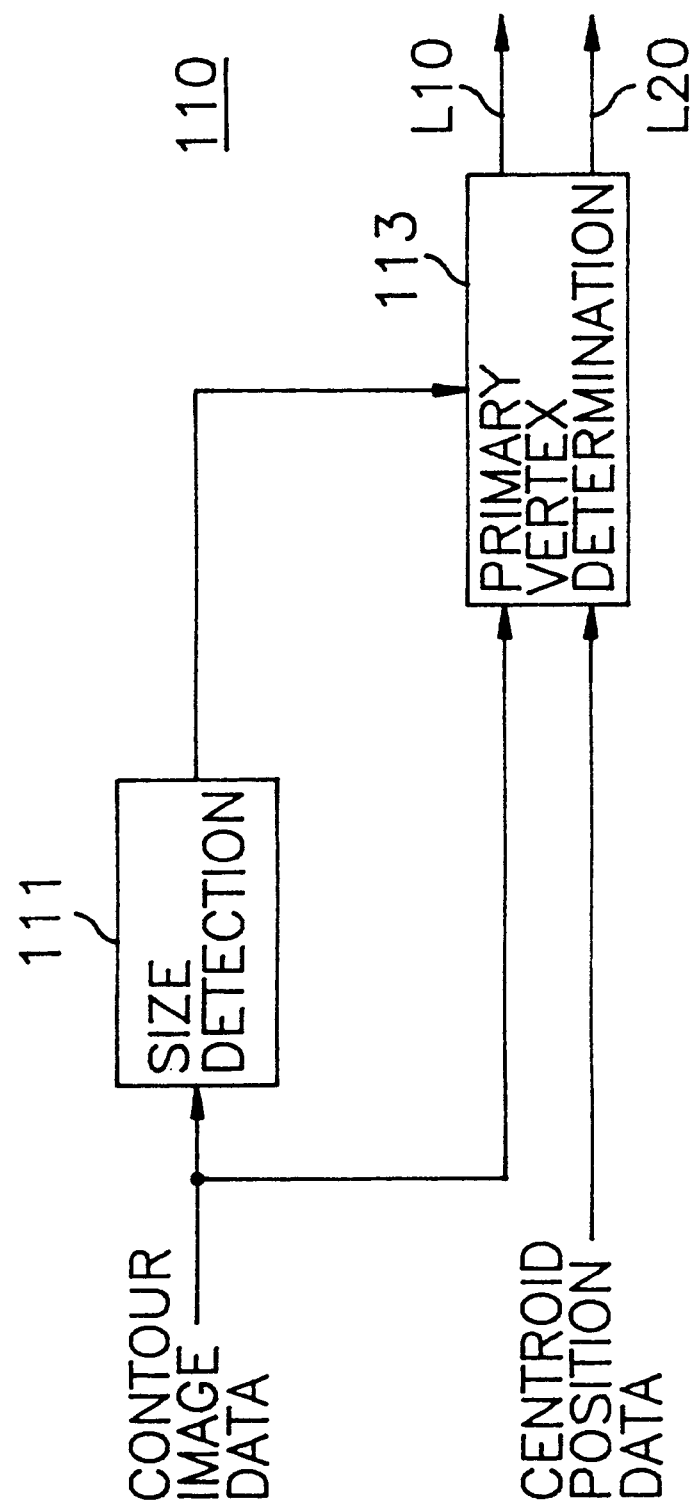
FIG. 2 represents a detailed block diagram of the primary vertex detection block shown in FIG. 1.

Referring to FIG. 2, there is depicted a detailed block diagram of the primary vertex detection block 110 which includes a size detection sector 111 and a primary vertex determination sector 113. The size detection sector 111 detects the size of the contour, e.g., by counting the number of contour pixels, i.e., pixels positioned on the contour, and provides the number of radial lines for dividing the contour to the primary vertex determination sector 113, wherein the number of radial lines is determined according to the size of the contour in such a manner that the number of radial lines is increased with the number of contour pixels.

Figure 3:
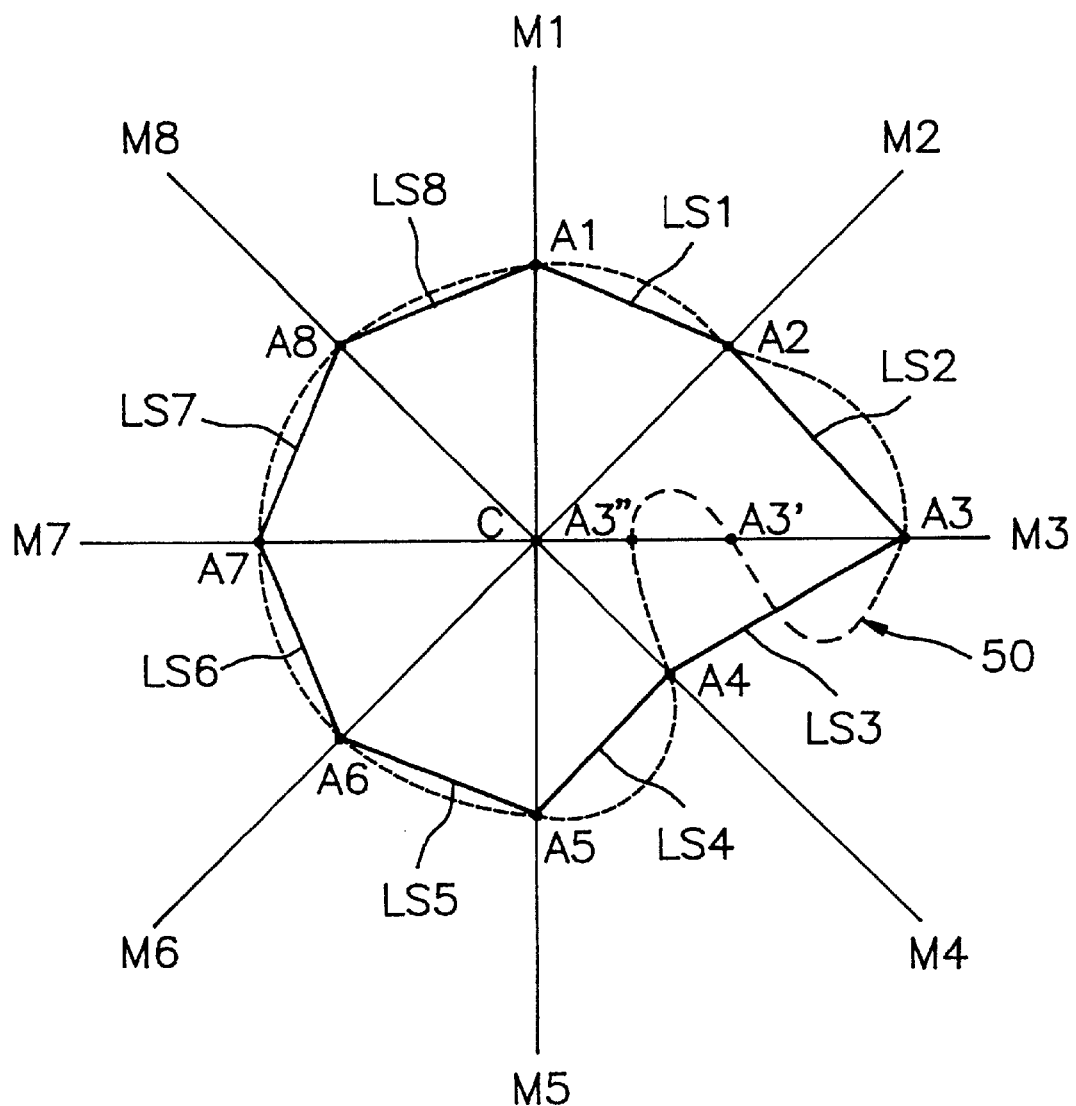
FIG. 3 illustrates an exemplary contour which has a centroid therein and is divided into 8 segmenting straight lines.

Referring to FIG. 3, there is illustrated a primary vertex determination process carried out at the primary vertex determination sector 113 in accordance with the preferred embodiment of the present invention, wherein a reference numeral 50 represents a contour in the form of a closed loop. As shown in FIG. 3, the primary vertex determination sector 113 draws, clockwise, in response to the number of radial lines, M, and the centroid position data, M number of radial lines, e.g., M1 to M8 from the centroid C, starting from a reference radial line M1, wherein the angle between each pair of immediate neighboring radial lines is ($2\pi/M$) radian with M being an integer larger than 1 and the reference radial line is drawn upwardly in the vertical direction from the centroid C. Thereafter, the primary vertex determination sector 113 detects primary vertices on the contour 50 and determines a distance between the centroid C and each of the primary vertices wherein a primary vertex is defined as an intersection point between the contour and a radial line, i.e., a position of a contour pixel on a radial line, and the primary vertices are indexed, e.g., clockwise, starting from a first primary vertex A1 on the reference radial line M1. If a radial line, e.g., M3, intersects with the contour at more than one point, e.g., A3, A3' and A3", the point, e.g., A3, whose distance to the centroid is closest to the one between a nearest preceding primary vertex, e.g., A2, and the centroid C is selected as a corresponding primary vertex. In case the reference radial line meets with the contour at more than one point, a point whose distance to the centroid is smallest may be selected as a first primary vertex. Line segments LS1 to LS8 approximating the contour 50 are obtained by drawing a straight line between each pair of immediate adjacent primary vertices, thus obtaining a closed polygon.

Primary vertex information representing the positions and indices of detected primary vertices, e.g., A1 to A8, is then provided from the primary vertex determination sector 113 to the secondary vertex detection block 120 shown in FIG. 1 through a line L10. Distance information representing respective distances D1 to D8 between the centroid C and the primary vertices A1 to A8 is also provided therefrom to a primary coder 130 on a line L20, the distances being indexed in an identical manner as for the primary vertices.

Referring back to FIG. 1, at the primary coder 130, the distance information is encoded by using the conventional DPCM(Differential Pulse Code Modulation) technique with respect to the distance D1 for the first primary vertex A1. That is, setting D1 as an initial predictor, a differential value between the predictor and D2 is calculated and a differential value for D3 is obtained by using D2 as a new predictor. The process continues until the differential value for the last primary vertex is calculated. Encoded primary vertex information, i.e., the DPCM data including the initial predictor, is then forwarded to the channel coder 150.

Figure 4A:
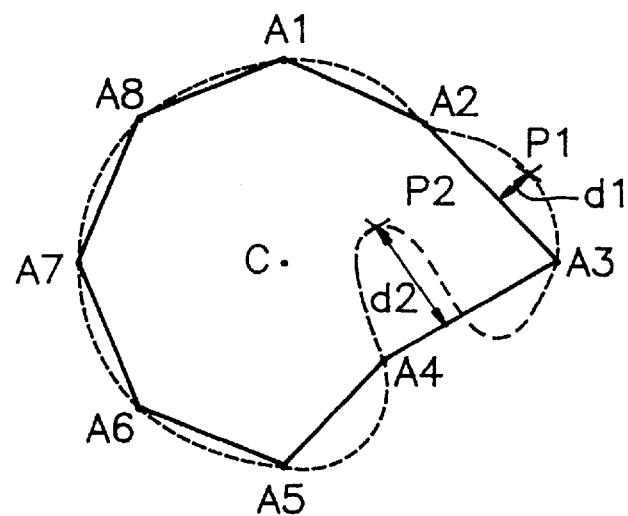
FIGS. 4A to 4C describe the process of detecting secondary vertices.
Figure 4B:
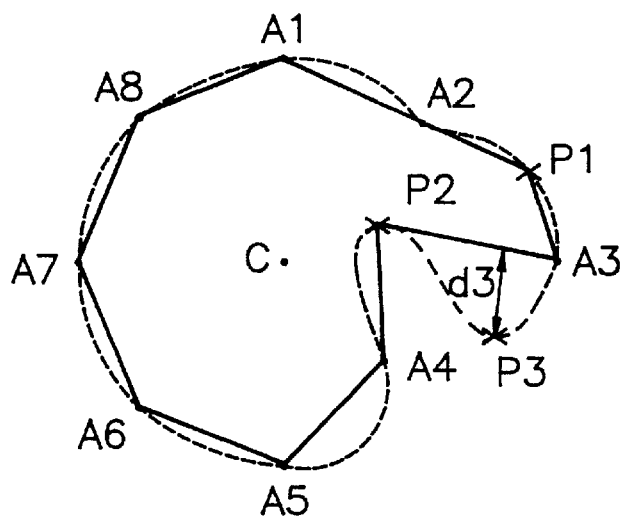
Figure 4C:
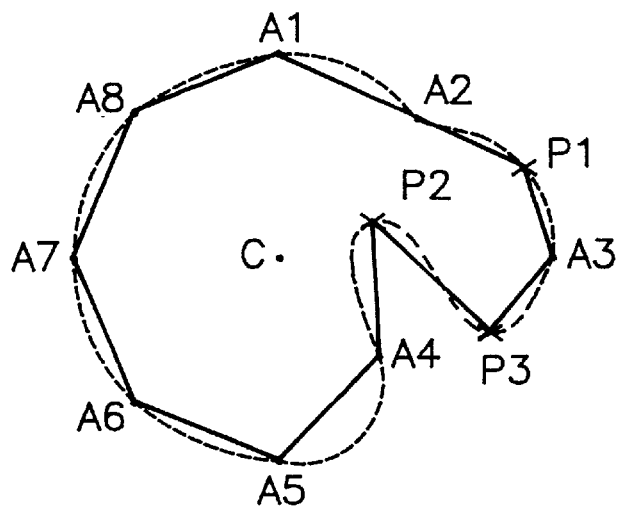

In the meantime, the secondary vertex detection block 120 determines secondary vertices, by using the conventional polygonal approximation technique, in response to the contour image data applied thereto and the primary vertex information from the primary vertex detection block 110. Specifically, the secondary vertex detection block 120 calculates a distance from each contour pixel on the contour segment between two adjacent primary vertices to the line segment of the polygon therebetween; and a contour pixel thereon having a maximum distance to the line segment is selected and determined as a corresponding secondary vertex if its distance is larger than a predetermined threshold value $D_M$. That is to say, as can be seen in FIG. 4A, if the distance, e.g., d1 or d2, between the line segment, e.g., $\overline{A2A3}$ or $\overline{A3A4}$, and the farthest contour pixel, e.g., P1 or P2, is greater than the predetermined threshold value $D_M$, the point P1 or P2 becomes a secondary vertex. Once all of the secondary vertices are determined for the contour through the above process, line segments of a closed polygon approximating the contour are obtained by connecting each pair of immediate adjacent vertices with a straight line, the vertices including the primary and the secondary vertices. As shown in FIG. 4B, for the contour approximated by the closed polygon, a contour pixel, e.g., P3, on newly formed contour segment having a maximum distance to the line segment, e.g., $\overline{P2A3}$, is repeatedly selected as a corresponding secondary vertex in the same manner described above until the maximum distance is equal to or smaller than the predetermined threshold value $D_M$, thereby detecting secondary vertices P1, P2 and P3 as shown in FIG. 4C.

In another embodiment of the present invention, the secondary vertex detection block 120 calculates a curvature of the contour at each contour pixel on each contour segment between two adjacent primary vertices. A curvature of the contour at a contour pixel denotes an angle change between two lines that pass through the contour pixel, wherein the two lines are drawn from the contour pixel to two other contour pixels located a predetermined number of pixels away therefrom along the contour in both directions, respectively. Once the curvatures at the contour pixels are determined for the contour segment, the secondary vertex detection block 120 selects all contour pixels on the contour segment having curvatures larger than a predetermined threshold value $C_M$; and determines a maximum preset number P of selected contour pixels in their descending order of magnitudes of their curvatures as secondary vertices, the P being a positive integer. Specifically, if the number of selected contour pixels are smaller than or equal to the preset number, all the selected contour pixels are determined as secondary vertices. If the number of selected contour pixels is larger than the preset number, the preset number of contour pixels in the descending order of their curvature magnitudes are selected and determined as the secondary vertices. In other words, all the secondary vertices selected within a contour segment have curvatures that are larger than the threshold value $C_M$ and not smaller than those of the unselected contour pixels and the number of the secondary vertices for the contour segment is not greater than the preset number P. A technique for calculating the curvature of the contour is described in a commonly owned copending application, U.S. Ser. No. 08/520,204, filed on Aug. 28, 1995 and entitled "IMPROVED CONTOUR APPROXIMATION METHOD FOR REPRESENTING A CONTOUR OF AN OBJECT".

Secondary vertex information representing the positions of detected secondary vertices and the primary vertex information are provided from the secondary vertex detection block 120 to the secondary coder 140. In accordance with the preferred embodiment of the invention, the secondary coder 140 finds a closest primary vertex for each secondary vertex and calculates a displacement of the secondary vertex therefrom; and encodes the index and the displacement for each secondary vertex through the use of, e.g., the arithmetic code of JPEG(Joint Picture Experts Group), thereby providing the coded secondary vertex information to the channel coder 150.

The channel coder 150 generates a digitally coded contour signal from the centroid position data, the coded primary and secondary vertex information in a suitable form for the transmission thereof wherein the digitally coded contour signal includes sequence information for forming a polygonal-approximated contour image from the primary and the secondary vertices.

While the present invention has been described with reference to the particular embodiments, it will be apparent to those skilled in the art that various changes and modifications may be made without departing from the spirit and scope of the invention as defined in the following claims.

What is claimed is:

1. A method for encoding a contour of an object expressed in a video signal, comprising the steps of:
   (a) detecting a centroid for the contour of the object by averaging pixel positions on the contour;
   (b) determining a set of primary vertices on the contour based on the centroid, the contour being approximated by connecting each pair of immediate adjacent primary vertices with a straight line; and
   (c) encoding the set of primary vertices and the centroid to thereby provide a digitally coded contour signal, wherein said step (b) includes the steps of:
      (b11) drawing M number of radial lines, including a reference radial line formed in a predetermined manner, from the centroid, wherein the angle between each pair of immediate adjacent radial lines is ($2\pi/M$) radian with M being an integer larger than 1;
      (b12) determining the set of primary vertices, each primary vertex representing an intersection point between the contour and a radial line; and
      (b13) indexing the set of primary vertices starting from the primary vertex for the reference radial line.

2. The method according to claim 1, which further comprises, after step (a), the step of detecting a size of the contour.

3. The method according to claim 2, wherein said M number is determined based on the size of the contour.

4. The method according to claim 1, wherein said step (b12) further includes the step of, when a radial line intersects with the contour at more than one point, selecting as the primary vertex a point whose distance to the centroid is closest to the distance between a nearest preceding primary vertex and the centroid.

5. The method according to claim 4, wherein said step (c) includes the steps of:

(c11) calculating an error at each primary vertex, the error representing a distance between the centroid and said each primary vertex; and
   (c12) obtaining differential errors based on the errors for the primary vertices.

6. A method for encoding a contour of an object expressed in a video signal, comprising the steps of:
   (a) detecting a centroid for the contour of the object by averaging pixel positions on the contour;
   (b) determining a set of primary vertices on the contour based on the centroid, the contour being approximated by connecting each pair of immediate adjacent primary vertices with a straight line;
   (c) encoding the set of primary vertices and the centroid to thereby provide a digitally coded contour signal;
   (d) determining a set of secondary vertices on the contour based on the set of primary vertices; and
   (e) encoding the set of secondary vertices, wherein said step (b) includes the steps of:
      (b21) drawing M number of radial lines including a reference radial line formed in a predetermined manner, from the centroid, wherein the angle between each pair of immediate adjacent radial lines is ($2\pi/M$) radian with M being an integer larger than 1;
      (b22) determining the set of primary vertices, each primary vertex representing an intersection point between the contour and a radial line; and
      (b23) indexing the set of primary vertices starting from the primary vertex for the reference radial line.

7. The method according to claim 6, which further comprises, after step (a), the step of detecting a size of the contour.

8. The method according to claim 7, wherein said M number is determined based on the size of the contour.

9. The method according to claim 6, wherein said step (b22) further includes the step of, when a radial line intersects with the contour at more than one point, selecting as the primary vertex a point whose distance to the centroid is closest to the distance between a nearest preceding primary vertex and the centroid.

10. The method according to claim 9, wherein said step (c) includes the steps of:

(c21) calculating an error at each primary vertex, the error representing a distance between the centroid and said each primary vertex; and
    (c22) obtaining differential errors based on the errors for the primary vertices.

11. The method according to claim 10, wherein said step (d) determines the set of secondary vertices by using a polygonal approximation technique.

12. The method according to claim 11, wherein said step (e) includes the steps of:

(e11) finding a closest primary vertex for each secondary vertex and a displacement therebetween; and
    (e12) encoding the index for the closest primary vertex to each secondary vertex and the displacement therebetween.

13. The method according to claim 10, wherein said step (d) includes the steps of:

(d21) calculating a curvature of the contour on a contour segment between two adjacent primary vertices; and
    (d22) determining a preset number of pixels on the contour segment as secondary vertices in descending order of magnitudes of their curvatures, each magnitude of their curvatures being larger than a predetermined threshold value.

14. The method according to claim 13, wherein said step (e) includes the steps of:
   (e21) finding a closest primary vertex to each secondary vertex and a displacement therebetween; and
   (e22) encoding the index for the closest primary vertex to each secondary vertex and the displacement therebetween.

15. The method according to claim 14, wherein a curvature of the contour at a pixel on the contour segment represents an angle change between two lines that cross the pixel, each of the two lines being drawn through the pixel and another pixel on the contour located a predetermined number of pixels away therefrom in each direction along the contour segment.

16. An apparatus for encoding a contour of an object expressed in a video signal, which comprises:
   means for detecting a centroid for the contour of the object by averaging pixel positions on the contour;
   means for determining a set of primary vertices on the contour based on the centroid, the contour being approximated by connecting each pair of immediate adjacent primary vertices with a straight line; and
   means for encoding the set of primary vertices and the centroid to thereby provide a digitally coded contour signal, wherein said primary vertex determining means includes:
      means for drawing M number of radial lines, including a reference radial line formed in a predetermined manner, from the centroid, wherein the angle between each pair of immediate adjacent radial lines is (2π/M) radian with M being an integer larger than 1;
      means for determining the set of primary vertices, each primary vertex representing an intersection point between the contour and a radial line; and
      means for indexing the set of primary vertices starting from the primary vertex for the reference radial line.

17. The apparatus according to claim 16, which further comprises means for detecting a size of the contour.

18. The apparatus according to claim 17, wherein said M number is determined based on the size of the contour.

19. The apparatus according to claim 16, wherein said primary vertex determining means further includes, when a radial line intersects with the contour at more than one point, means for selecting as the primary vertex a point whose distance to the centroid is closest to the distance between a nearest preceding primary vertex and the centroid.

20. The apparatus according to claim 19, wherein said primary vertex encoding means includes:
   means for calculating an error at each primary vertex, the error representing a distance between the centroid and said each primary vertex; and
   means for obtaining differential errors based on the errors for the primary vertices.

21. An apparatus for encoding a contour of an object expressed in a video signal, which comprises:
   means for detecting a centroid for the contour of the object by averaging pixel positions on the contour;
   means for determining a set of primary vertices on the contour based on the centroid, the contour being approximated by connecting each pair of immediate adjacent primary vertices with a straight line;
   means for encoding the set of primary vertices and the centroid to thereby provide a digitally coded contour signal;
   means for determining a set of secondary vertices on the contour based on the set of primary vertices; and
   means for encoding the set of secondary vertices, wherein said primary vertex determining means includes:
      means for drawing M number of radial lines including a reference radial line formed in a predetermined manner, from the centroid, wherein the angle between each pair of immediate adjacent radial lines is (2πM) radian with M being an integer larger than 1;
      mean for determining the set of primary vertices, each primary vertex representing an intersection point between the contour and a radial line; and
      means for indexing the set of primary vertices starting from the primary vertex for the reference radial line.

22. The apparatus according to claim 21, which further comprises means for detecting a size of the contour.

23. The apparatus according to claim 22, wherein said M number is determined based on the size of the contour.

24. The apparatus according to claim 21, wherein said primary vertex determining means further includes, when a radial line intersects with the contour at more than one point, means for selecting as the primary vertex a point whose distance to the centroid is closest to the distance between a nearest preceding primary vertex and the centroid.

25. The apparatus according to claim 24, wherein said primary vertex encoding means includes:
   means for calculating an error at each primary vertex, the error representing a distance between the centroid and said each primary vertex; and
   means for obtaining differential errors based on the errors for the primary vertices.

26. The apparatus according to claim 25, wherein said secondary vertex determining means determines the set of secondary vertices by using a polygonal approximation technique.

27. The apparatus according to claim 26, wherein said secondary vertex encoding means includes:
   means for finding a closest primary vertex for each secondary vertex and a displacement therebetween; and
   means for encoding the index for the closest primary vertex to each secondary vertex and the displacement therebetween.

28. The apparatus according to claim 25, wherein said secondary vertex determining means includes:
   means for calculating a curvature of the contour on a contour segment between two adjacent primary vertices; and
   means for determining a preset number of pixels on the contour segment as secondary vertices in descending order of magnitudes of their curvatures, each magnitude of their curvatures being larger than a predetermined threshold value.

29. The apparatus according to claim 28, wherein said secondary vertex encoding means includes:
   means for finding a closest primary vertex to each secondary vertex and a displacement therebetween; and
   means for encoding the index for the closest primary vertex to each secondary vertex and the displacement therebetween.

30. The apparatus according to claim 29, wherein a curvature of the contour at a pixel on the contour segment represents an angle change between two lines that cross the pixel, each of the two lines being drawn through the pixel and another pixel on the contour located a predetermined number of pixels away therefrom in each direction along the contour segment.

* * * * *